No. 737,319. Patented August 25, 1903.

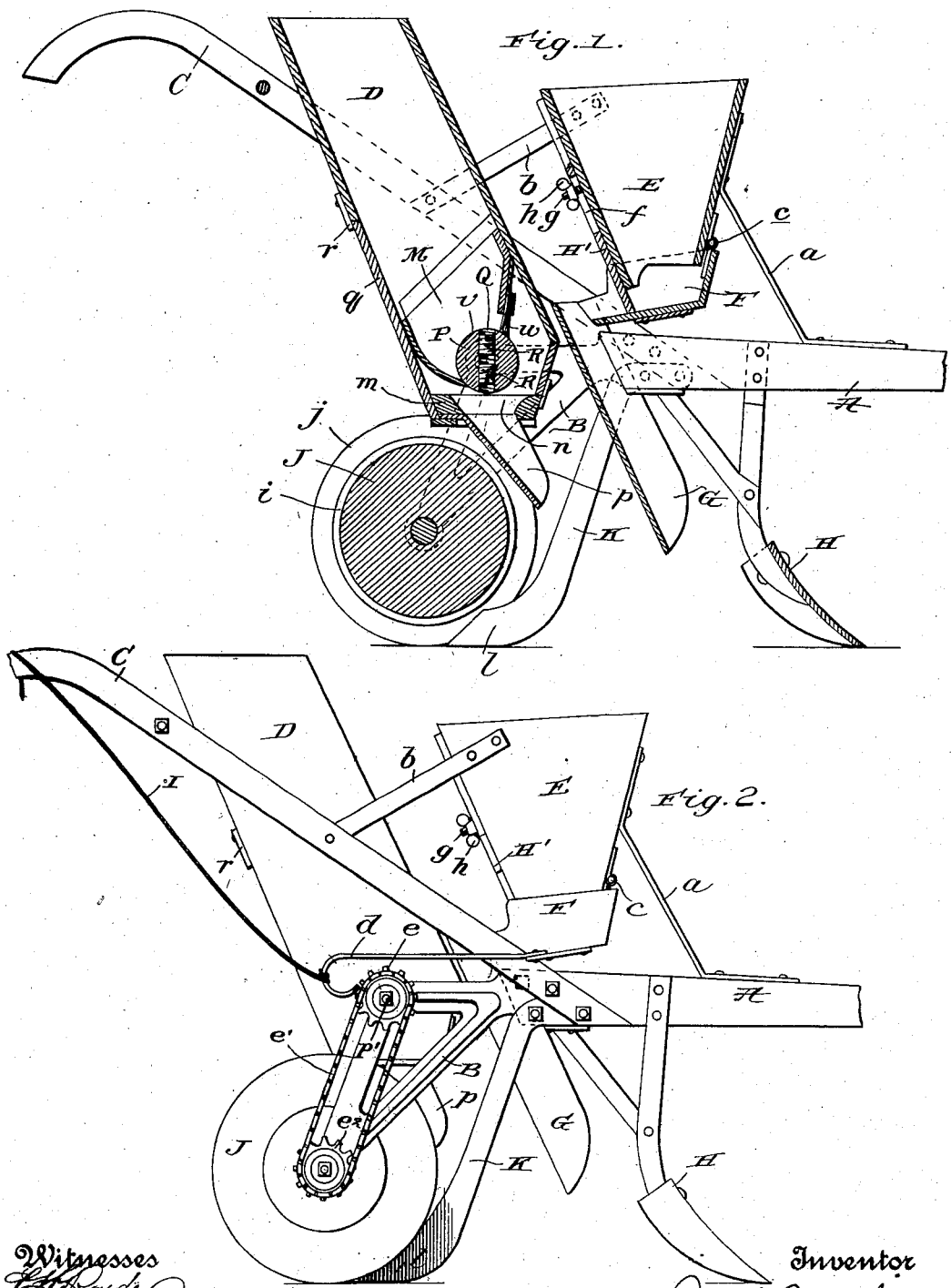

UNITED STATES PATENT OFFICE.

JOHN H. BEDINGFIELD, OF BETHLEHEM, GEORGIA.

COMBINED SEED-PLANTER AND FERTILIZER-DISTRIBUTER.

SPECIFICATION forming part of Letters Patent No. 737,319, dated August 25, 1903.

Original application filed June 9, 1902, Serial No. 110,842. Divided and this application filed December 27, 1902. Serial No. 136,825. (No model.)

*To all whom it may concern:*

Be it known that I, JOHN H. BEDINGFIELD, a citizen of the United States, residing at Bethlehem, in the county of Walton and State of Georgia, have invented new and useful Improvements in a Combined Seed-Planter and Fertilizer-Distributer, of which the following is a specification.

My invention relates to combined seed-planters and fertilizer-distributers; and it has for one of its objects to provide a machine which while simple and compact in construction is highly efficient in opening a furrow, depositing fertilizer therein, and lightly covering the fertilizer with earth precedent to depositing the seed, the light covering of the fertilizer with earth before the deposition of the seed being highly advantageous, since if the seed came into direct contact with the fertilizer the latter would retard and in many cases prevent germination of the seed.

With the foregoing in mind the invention will be fully understood from the following description and claim when taken in conjunction with the accompanying drawings, in which—

Figure 1 is a longitudinal vertical section of my improved seed-planter and fertilizer-distributer. Fig. 2 is a side elevation of the machine.

Similar letters of reference designate corresponding parts in both views of the drawings, referring to which—

A is the beam of my improved machine, which is preferably of wood; B B, hangers, preferably castings or other metallic sections, connected to opposite sides of the beam adjacent to the rear end thereof and extending rearwardly and downwardly therefrom, and C C handles connected to and extending upwardly and rearwardly from the rear portion of the beam. These parts in the preferred embodiment of my invention constitute the main frame of the combined seed-planter and fertilizer-distributer.

D is a seedbox secured between the hangers B and also between the handles C; E, a fertilizer-hopper arranged above the beam A and in advance of the box D and connected by braces $a$ $b$ with said beam and box, respectively, and open at its lower end; F, a trough-like shoe arranged to receive fertilizer from the hopper; G, a chute secured in the frame at the rear of the beam A and arranged to receive fertilizer from the shoe F and convey the same downwardly in advance of the discharge of the seedbox D, and H a plow suitably connected to the beam A and disposed in advance of the chute G. By virtue of this relative arrangement of parts it will be observed that when the machine is in operation a small amount of dirt is caused to roll back over and lightly cover the fertilizer before the seed falls, with the result that the seed will be kept from coming in direct contact with the fertilizer. This will be appreciated as an important advantage when it is remembered that fertilizer, such as guano, retards and frequently prevents germination of seeds when it is in direct contact or close to the same. On the other hand, when the seed and guano are separated by a small portion of dirt the dirt will be enriched and the germination of the seed materially accelerated.

The shoe F is hinged at $c$ on the front side of the fertilizer-hopper E and is provided with a rearwardly-extending spring-arm $d$, the rear end of which is arranged to be engaged by a sprocket-wheel $e$. From this it follows that when the wheel $e$ is rotated and the arm $d$ is in its normal position the shoe F will be vibrated or oscillated vertically and the discharge of fertilizer from the hopper E accelerated.

H' is an adjustable gate through the medium of which the discharge of fertilizer from the hopper E may be regulated. This gate is arranged at the back of the hopper with its lower end in the shoe F and is longitudinally slotted at $f$ and connected to the hopper by a bolt $g$ and a wing-nut $h$.

I is a cord connected to the arm $d$ of the shoe F and extending upwardly to one of the handles C. This cord enables the operator of the machine to conveniently hold the said arm $d$ out of engagement with the sprocket-wheel $e$, so as to prevent oscillation of the shoe F and discharge of fertilizer, as when the machine is being turned at one end of a row or is being drawn from one point to another.

J is a wheel or roller which has for its purpose to press the earth on the seeds with a view of promoting the germination of the seeds. This wheel, which is arranged between and mounted in the hangers B, is preferably provided with a slightly concave periphery $i$ and flanges $j$, the said flanges being designed to cut the dirt and press it inwardly on the seeds, so as to cover same.

K K are blades connected to and extending downwardly and rearwardly from the rear portion of the beam A. These blades have lower portions $l$, disposed obliquely to the wheel-flanges $j$ and reaching laterally outward beyond the planes of the sides of the wheel, and hence they are enabled to gather into the path of the wheel more dirt than the wheel can reach, this with a view of insuring the covering of the deposited seed with dirt, and thereby promoting the germination of the seed.

The seedbox D is preferably, although not essentially, provided with a bottom $m$, having a tapered opening $n$ and a depending spout $p$, and also with a removable panel or door $q$, normally retained in the position shown in Fig. 1 by a turn-button $r$. The said removable panel or door is designed to permit of the false bottom M being readily placed in and as readily removed from the seedbox. The false bottom M is provided at its lower side with a concavity $v$ of a shape and size to snugly fit over the seed-discharging cylinder P, presently described, and it is also provided with a brush $w$, the purpose of which is to prevent any seed being discharged except those contained in the pockets of the cylinder P.

Q is a diametrical interiorly-threaded bore formed in the cylinder P, and R R threaded plugs arranged in the said bore and serving in conjunction with the same to form diametrically opposite pockets for the reception of grains of corn. The said plugs are kerfed at their outer ends to adapt them for engagement with a screw-driver, and when they are turned inwardly it will be seen that the capacity of the pockets is increased, while when they are turned outwardly the capacity of the pockets is diminished. It will also be seen that when desired one of the plugs may be arranged flush with the perimeter of the cylinder P, in which event but one pocket will be provided to receive from the seedbox and corn will be discharged but once incident to each revolution of the cylinder P. When two pockets are provided in the cylinder in position to receive from the seedbox, corn will obviously be discharged from the machine twice incident to each revolution of the cylinder.

The cylinder P is preferably of the construction disclosed in my contemporary pending application, filed June 9, 1902, Serial No. 110,842, of which the present application is a division. I desire it understood, however, that any other rotary seed-discharging device may be employed in lieu of the cylinder P without involving a departure from the scope of my present invention. The cylinder P is carried by a shaft P', which is journaled in the hangers B and also carries the sprocket-wheel $e$, and since the said sprocket-wheel $e$ is connected by a belt $e'$ with a sprocket-wheel $e^2$ on one trunnion of the wheel J it will be observed that when the machine is in motion the cylinder P will be rotated in the same direction as the wheel J.

The distance between the hills of seeds may be regulated either by adjusting the plugs in the bores of the cylinder P or employing different sizes of sprocket-wheels on the shaft P' and the trunnion of the wheel J.

I prefer in practice to removably arrange the bottom $m$ of the seedbox on ledges at the lower end of the box and secure it normally in such position by a button, as best shown in Fig. 1.

I have entered into a detailed description of the construction and relative arrangement of parts embraced in the present and preferred embodiment of my invention in order to impart a full, clear, and exact understanding of the same. I do not desire, however, to be understood as confining myself to such specific construction and arrangement of parts, as such changes or modifications may be made in practice as fairly fall within the scope of my claim.

Having described my invention, what I claim, and desire to secure by Letters Patent, is—

In a machine for the purpose described, the combination of a frame, a seedbox carried thereby, a seed-discharging cylinder journaled in the box, a traveling wheel, a sprocket-wheel $e^2$ fixed with respect to the traveling wheel, a sprocket-wheel $e$ fixed with respect to the seed-discharging cylinder, a sprocket-belt connecting the wheels $e^2$ and $e$, a fertilizer-hopper mounted on the frame, and open at its lower end, and a shoe hinged to the hopper, and disposed below the lower end thereof, and having a rearwardly-extending arm arranged to be engaged by the tappet.

In testimony whereof I have hereunto set my hand in presence of two subscribing witnesses.

JOHN H. BEDINGFIELD.

Witnesses:
S. A. STARR,
W. B. TREADWELL.